United States Patent [19]
Pierik et al.

[11] Patent Number: 5,666,931
[45] Date of Patent: Sep. 16, 1997

[54] INTEGRATED ENGINE DILUTION CONTROL

[75] Inventors: Ronald Jay Pierik; Daniel Francis Kabasin, both of Rochester, N.Y.

[73] Assignee: General Motors Corporation, Detroit, Mich.

[21] Appl. No.: 634,500

[22] Filed: Apr. 18, 1996

[51] Int. Cl.⁶ .................................................. F02M 25/07
[52] U.S. Cl. ............................................ 123/568; 123/571
[58] Field of Search .................................. 123/568, 569, 123/570, 571, 90.15, 90.16

[56] References Cited

U.S. PATENT DOCUMENTS

| | | | |
|---|---|---|---|
| 4,357,917 | 11/1982 | Aoyama | 123/568 |
| 4,722,315 | 2/1988 | Pickel | 123/568 |
| 4,986,225 | 1/1991 | Wu et al. | 123/184.54 |
| 4,991,547 | 2/1991 | Davis et al. | 123/568 |
| 5,029,570 | 7/1991 | Stoltman et al. | 123/571 |
| 5,123,397 | 6/1992 | Richeson | 123/568 |
| 5,203,830 | 4/1993 | Faletti et al. | 123/571 |
| 5,224,460 | 7/1993 | Havstad et al. | 123/568 |
| 5,226,401 | 7/1993 | Clarke et al. | 123/571 |
| 5,367,990 | 11/1994 | Schechter | 123/568 |
| 5,372,108 | 12/1994 | Wu | 123/311 |
| 5,404,844 | 4/1995 | Schechter | 123/568 |
| 5,515,832 | 5/1996 | Bidner et al. | 123/571 |

*Primary Examiner*—Willis R. Wolfe
*Attorney, Agent, or Firm*—Michael J. Bridges

[57] ABSTRACT

Integrated dilution control for diluting internal combustion engine intake air through control of relative timing between engine cylinder intake and exhaust valve events integrated with control of recirculation of engine exhaust gas through an external exhaust gas conduit with periodic recalibration of modeled relationships between dilution control parameters to correct for effects of dilution control system aging. Internal dilution provided through control of relative valve timing further may be maximized and external dilution provided through the external conduit minimized.

11 Claims, 5 Drawing Sheets

INTEGRATED ENGINE DILUTION CONTROL

FIELD OF THE INVENTION

This invention relates to automotive internal combustion engine dilution control and, more particularly, to integrated control of internal and external dilution of engine cylinder intake air charge.

BACKGROUND OF THE INVENTION

Engine intake air charge dilution with recirculated engine exhaust gas is applied in automotive engine controls to inhibit production of the undesirable engine exhaust gas component of oxides of nitrogen (NOx). Precise control of intake air charge dilution can lead to significant NOx reduction with minimum engine performance deterioration. Dilution may be internal to the engine or may be external. In external dilution, engine exhaust gas is drawn from an exhaust gas conduit into the engine intake manifold through an "external" valved conduit. A degree of opening of a valve, such as a solenoid, within the conduit is varied to control dilution of the fresh air charge in the intake manifold.

Internal dilution is provided through variation in relative timing between intake and exhaust valve events of an engine cylinder to create a valve overlap period during which both valves are open allowing cylinder exhaust gas to backflow from the exhaust port into the chamber and perhaps even through the intake port to the cylinder intake runner or intake plenum. An exhaust camshaft phaser may be used to vary engine cylinder valve timing. Maximum internal dilution is provided when the exhaust camshaft phaser is in a full retard (or a minimum advance) position corresponding to a maximum valve overlap period. Precisely controlled internal dilution is known to yield a NOx reduction without a significant penalty in emissions of hydrocarbons (HC). Precision internal dilution control conventionally requires closed-loop camshaft phaser position control responsive to a feedback signal from a camshaft phaser position transducer indicating actual camshaft phaser position. A camshaft phaser drive command is varied in response to a difference between a desired camshaft phaser position and the position indicated by the feedback signal. Camshaft phaser position transducers are typically complex and expensive and may suffer reliability shortcomings.

Conventional dilution control approaches, whether internal or external, generally prescribe a degree of dilution of the engine fresh intake air charge as a function of engine operating conditions. A dilution control command that corresponds to the prescribed dilution is then referenced from a static calibration schedule or from a static calibrated function, and either an EGR valve or a camshaft phaser are driven in accord with the referenced command. The calibration conditions under which the static schedule or the static function was generated can change significantly over the life of the system, for example due to component aging, change in exhaust gas flow characteristic, for example due to system contamination, and change in backpressure through the system. Such changes are not contemplated in static schedules or functions determined under calibration conditions, and can therefore lead to inaccurate intake air dilution control and increased engine emissions.

It would therefore be desirable to provide for precision internal dilution control via variable valve timing control that does not require use of expensive or complex camshaft phaser position transducers and their associated complex and costly wiring and circuitry. It would further be desirable that such an internal dilution control account for any variation in dilution control parameter relationships over the life of the dilution control system, so that precise dilution control can be maintained despite any such variation.

SUMMARY OF THE INVENTION

The present invention provides precision dilution control integrating both internal and external dilution control sources and responsive to change in the relationship between dilution control parameters. Camshaft phaser position transducers are not required for precision internal dilution control. Internal dilution may be maximized to suppress NOx emissions without sacrificing HC emissions.

More specifically, a method for controlling dilution of an engine intake air charge integrates internal dilution, which may be maximized, with external dilution, which may be minimized, for NOx reduction. Periodically, and especially when operating conditions permit, the relationship between dilution control parameters is recalibrated to provide dilution control baseline information. For example, a relationship between the dilution control parameters of engine load (EL) and engine intake manifold (or plenum) absolute air pressure (MAP) may be periodically updated or recalibrated over a range of engine loads through measurement of such parameters in the absence of dilution. The updated relationship may then be stored and subsequently used in both internal and external dilution control. For a given engine load, a manifold pressure required to attain zero dilution is then known. A desired dilution factor is then determined as a function of engine operating conditions when dilution is active, for minimizing certain engine emissions. The dilution factor is applied to the updated relationship and, for current engine load, a target MAP is determined. Camshaft phaser position is then adjusted as a function of the difference between the target MAP and a current measured MAP value to provide for the desired MAP. The precision and robustness of a closed-loop internal dilution control strategy is provided without a requirement for a camshaft phaser position transducer by responding to the effects of camshaft phaser position and not to the position itself. The precision is maintained throughout the life of the system despite change in backpressure through the system and despite aging and contamination of dilution control components.

In accord with a further aspect of this invention, external dilution is combined with the internal dilution through a closed-loop valve position control of a valve within an exhaust gas recirculation conduit. The level of external dilution is varied to, in one embodiment, maximize internal dilution for a dual emissions control benefit of reduced NOx and reduced HC levels in the engine exhaust.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
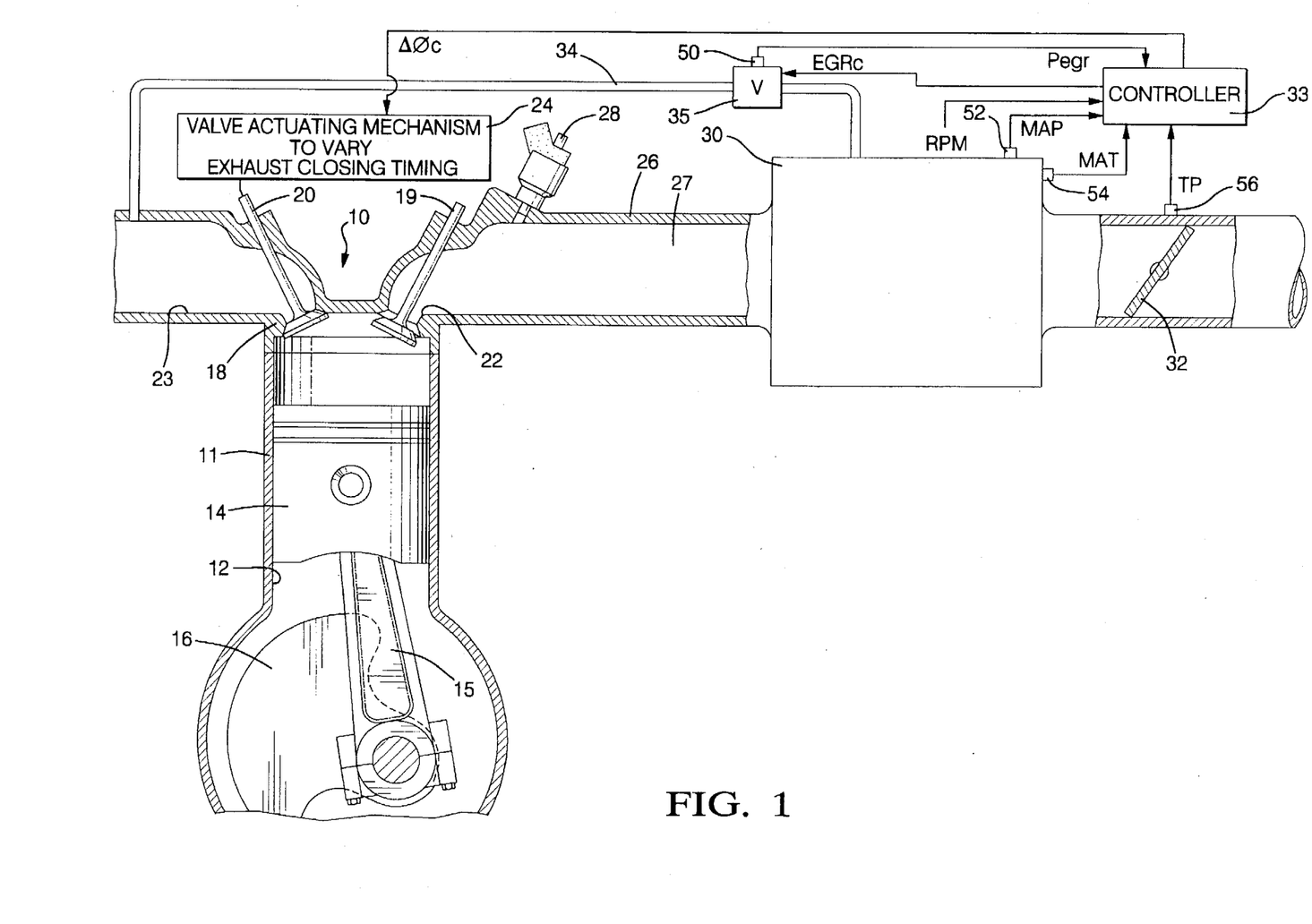
FIG. 1 is a general diagram of the engine dilution control system of the preferred embodiment.

Referring to FIG. 1, a spark ignited four stroke cycle internal combustion engine 10 includes a cylinder block 11 having multiple cylinders 12 only one being illustrated. Each cylinder has a piston 14 reciprocable therein and connected by a connecting rod 15 to a crankshaft 16. A cylinder head 18 closes the end of the cylinder 12 above the piston and includes at least one intake valve 19 and at least one exhaust valve 20 respectively controlling at least one intake port 22 and at least one exhaust port 23 connecting with the cylinder.

Valved exhaust gas conduit 34 opens into exhaust port 23 and, on an opposing end thereof, into intake manifold or plenum 30 for providing a recirculation path for a portion of the engine cylinder exhaust gasses exiting the cylinder 11, under influence of the pressure drop between the exhaust port 23 and the intake plenum 30. Electrically controlled solenoid EGR valve V 35 is located in the conduit 34 having a pintle (not shown) which is positioned in the valve V 35 for restricting the flow of the exhaust gas through the valve V Variable timing exhaust valve actuation means 24 are provided of any suitable type. The intake port connects with an intake runner 26 to define an intake passage 27 into which fuel is injected by a fuel injector 28. Upstream, intake plenum 30 connects with each of the passages 27 and with an air intake tube 31 having a main throttle 32 of the butterfly or rotary type.

Controller 33 takes the form of a conventional electronic microcontroller comprising such well-known elements as a central processing unit, read only memory devices, random access memory devices, and input/output devices (not shown). The controller 33 receives input signals from parameter sensors and transducers and, through execution of sequences of control commands stored in read only memory devices, processes the signals and provides for engine control and diagnostics responsive to the processed signals. A periodic signal RPM is output by a conventional sensor, such as a variable reluctance or Hall effect sensor (not shown) positioned in proximity to the crankshaft 16 indicating rate of rotation of the crankshaft.

Pressure transducer 52 in the intake plenum 30 transduces absolute air pressure therein and outputs signal MAP indicative thereof. The angular position of the intake air valve 32 indicating the degree of opening of the valve is transduced by any suitable conventional sensor 56, such as a rotary potentiometer providing output signal TP indicating such angular position. Temperature sensor 54, such as a conventional thermister or thermocouple is positioned in the plenum for transducing air temperature therein and outputting signals MAT indicating such temperature. EGR valve pintle position sensor 50, in the form of a linear potentiometer, is mechanically linked to the pintle of the EGR valve V 35 for transducing the degree of opening of the pintle within the valve into output signal Pegr.

The controller 33 receives the input signals MAP, RPM, TP, MAT, and Pegr and, through execution of a series of control procedures, for example stored in read only memory devices in the form of sequences of program steps, generates and issues control commands to engine control actuators and generates diagnostic values which may be stored or displayed. Among the control procedures are those illustrated in FIGS. 3–7 for engine control and for integrated dilution control including both external and internal dilution control in accord with this invention.

Figure 2:
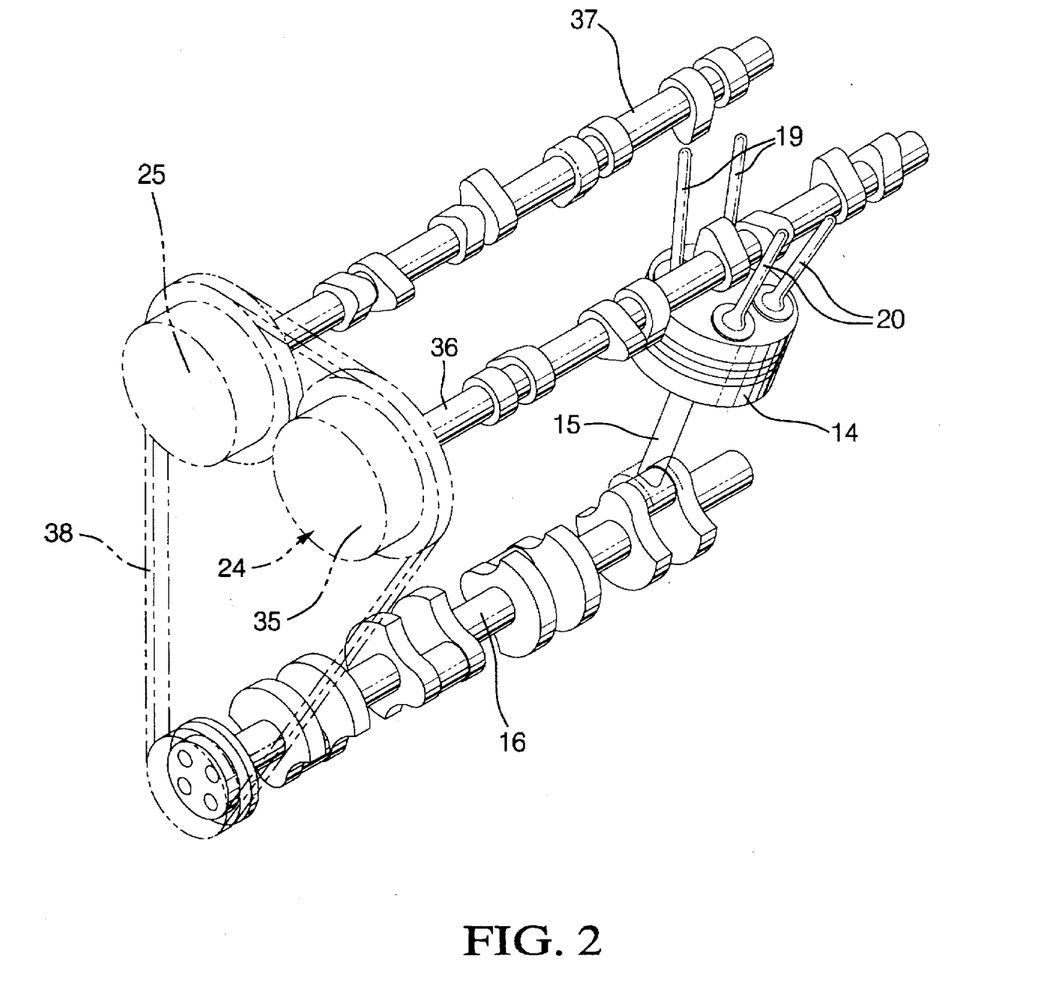
FIG. 2 is a pictorial view of the engine of FIG. 1 incorporating a camshaft phaser for variable valve timing.
Figure 3:
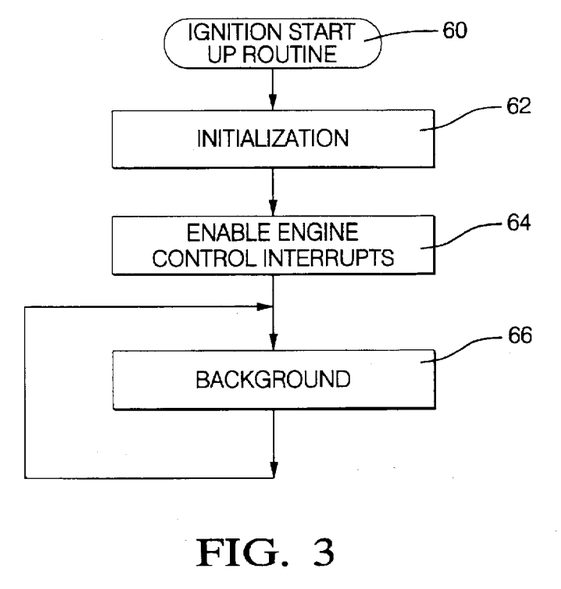
FIGS. 3-6 are flow diagrams illustrating a flow of operations for integrated external and internal dilution control applied to the hardware of FIG. 1 in accord with the preferred embodiment.

In an embodiment illustrated in FIG. 2, the exhaust valve actuating mechanism 24 comprises an exhaust cam phaser 35 capable of varying the phase angle of the exhaust camshaft 36 which actuates the at least one exhaust valve 20 of FIG. 1 through valve gear (not shown) relative to the phase angle of the crankshaft 16 by which the exhaust camshaft 36 is driven. An intake camshaft 37 also driven by the crankshaft through a pulley means 25 for actuating the at least one intake valve 19, providing for a substantially fixed phase angle between the intake camshaft 37 and the crankshaft 16 in this embodiment. The camshaft phaser 35 and pulley means 25 are driven by the crankshaft through a chain 38. An internal planetary gear mechanism (not shown) in the exhaust camshaft phaser is adjustable to vary the camshaft phase angle. Details of an engine application including a camshaft phaser of this type are found in U.S. Pat. No. 5,327,859, assigned to the assignee of this application, and one example of operational details of a camshaft phaser of this type are found in U.S. Pat. No. 5,372,108, assigned to the assignee of this application.

Referring to FIGS. 3–7, control procedures are illustrated for timed execution in a step by step manner by controller 33 of FIG. 1. Specifically, the operations of the routine of FIG. 3 describe an ignition startup routine to be executed by the controller 33 of FIG. 1 starting at a first step 60 upon application of ignition power to the controller 33 (FIG. 1), such as at the start of an automotive vehicle ignition cycle. The routine moves from the step 60 to carry out general initialization operations at a step 62 which include resetting pointers and counters, setting flags to predetermined initial values, and clearing memory locations. Engine control interrupts are next enabled at a step 64 to allow occurrence of both timer-based and event-based controller interrupts supporting both synchronous and asynchronous control and diagnostic operations as is generally understood in the art. Background operations of a relatively low priority are then repeatedly executed at a step 66 while the controller is operating. Such operations include low priority controller and system maintenance operations. Upon occurrence of any of the timer or event-based interrupts enabled at the step 64, the background operations will be temporarily suspended, and an interrupt service routine corresponding to the interrupt will be executed including, for example, control and diagnostic operations. Upon completion of the operations of the service routine, the background operations are resumed.

Figure 4:
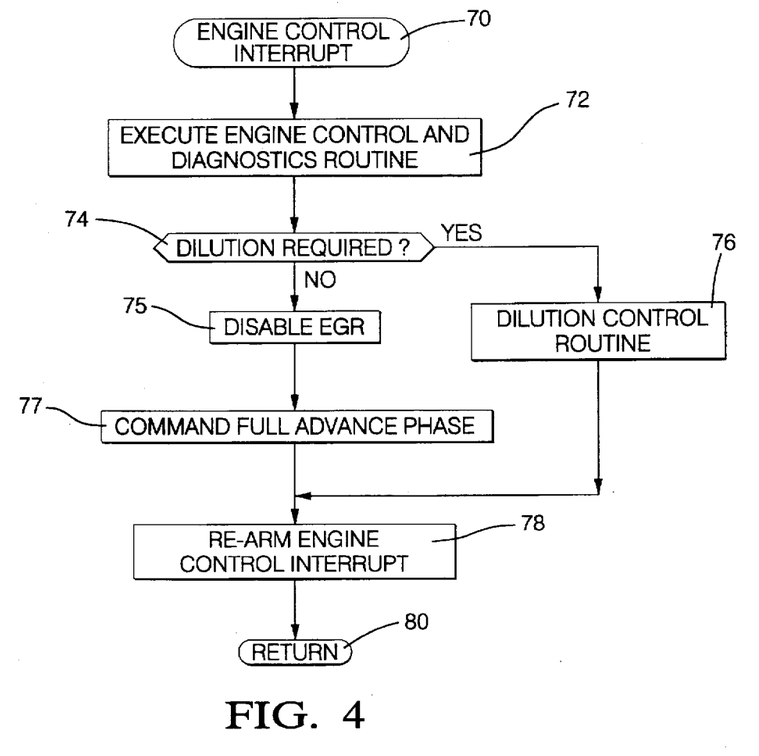
Figure 5:
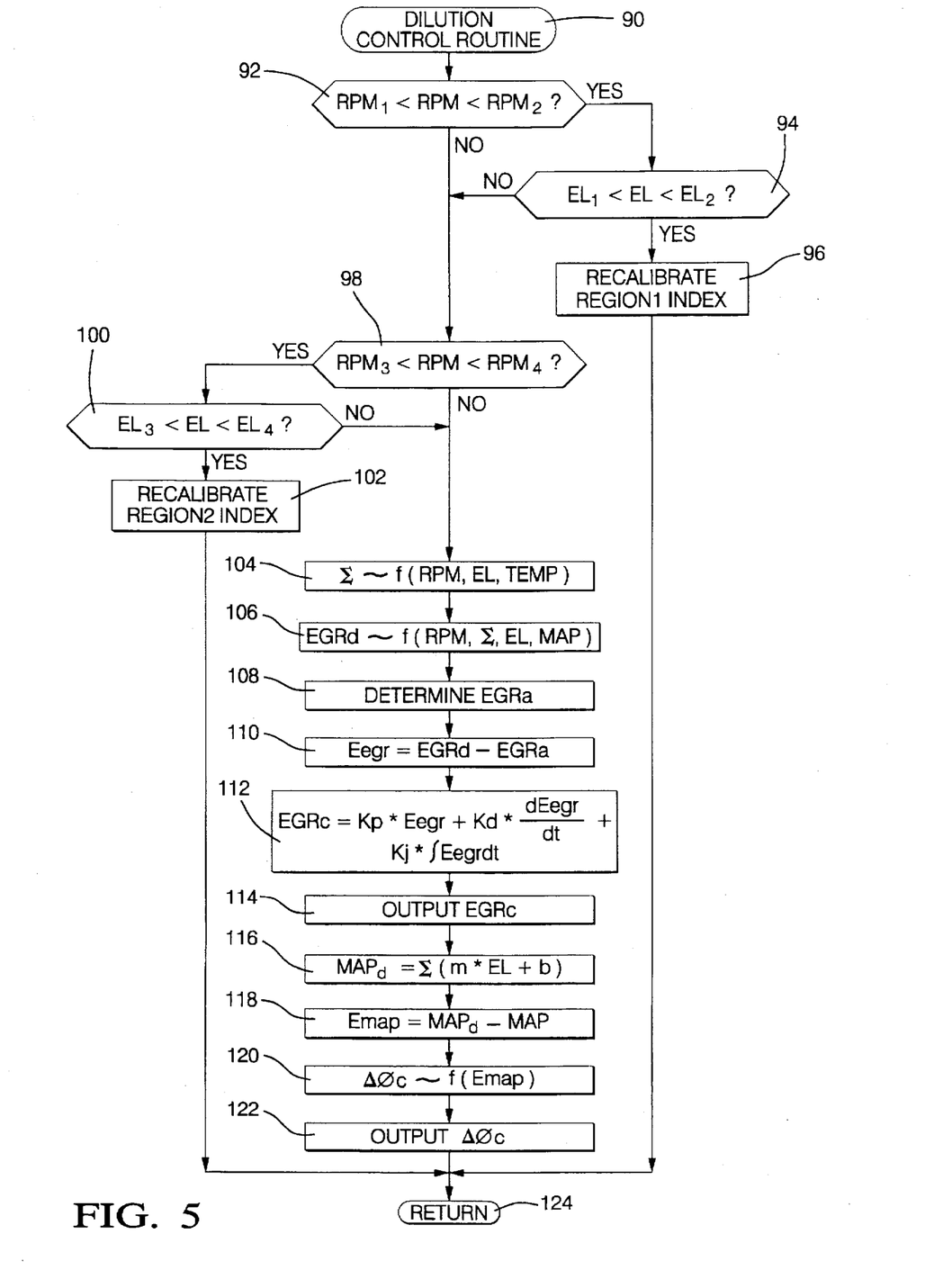

An interrupt service routine corresponding to an engine control interrupt is illustrated as FIG. 4. Upon occurrence of an engine control interrupt, which is a timer-based interrupt in this embodiment set up to occur approximately every 6.25 milliseconds while the controller 33 (FIG. 1) is operating, any ongoing operations, such as the described background operations, are temporarily suspended and the operations of the routine of FIG. 4 are carried out starting at a step 70. The operations of FIG. 4 are general engine control and diagnostic operations including operations to provide for integrated dilution control in accord with this invention. Following the step 70, a set of conventional engine control and diagnostics routines is executed at a next step 72 in accord with general practice in the art. Such routines may provide for engine fueling and ignition timing control, and general engine diagnostics. Engine operating conditions are next analyzed at a step 74 to determine if the integrated dilution control of this embodiment may be used for engine emissions reduction. Such operating conditions may include general fault conditions and conditions indicating the operational stability of the engine and the technical feasibility of emissions reduction through either internal or external dilution control, or both. If it is determined that dilution control may be used, a dilution control routine, illustrated as FIG. 5, is next executed at a step 76. If dilution control is not to be used, EGR is disabled at a next step 75, such as by outputting a command EGRc to the EGR valve V 35 (FIG. 1) corresponding to a closed valve and, at a next step 77, a full advance phase is commanded by outputting a camshaft phaser position command $\Delta\phi c$ to the camshaft phaser 24 (FIG. 1) corresponding to a fully advanced camshaft phaser position, to minimize dilution. Next, or following the step 76, the engine control interrupt is re-armed (re-enabled) to recur following a predetermined period of time of about 6.25 milliseconds. The routine then returns, via step 80, to resume execution of any interrupted operations, such as the background operations of FIG. 3.

Referring to FIG. 5, a series of integrated dilution control operations are illustrated. The dilution control operations of this embodiment provide for coordinated control of both internal and external dilution through variation in engine cylinder exhaust valve timing relative to crankshaft angle and control of externally recirculated exhaust gas EGR. Additionally, the dilution control operations of this embodiment provide for an updating or recalibration of modeled relationships between engine dilution control parameters of engine load EL and intake plenum pressure MAP over a wide EL, MAP range. Such modeled relationship forms the foundation for determination of closed-loop dilution control commands and can vary significantly over the operating life of the dilution control system due, for example, to part aging, wear and contamination, and due to changes in system backpressure and flow dynamics. The recalibration provided through the operations of this embodiment adjusts the integrated dilution control system to account for such system changes to maintain accurate dilution control over the life of the system. The recalibration of the model is repeatedly carried out over the operating life of the system.

To minimize the intrusiveness of the recalibration on engine control operations, the recalibration is only executed when dilution control, although available, is undesirable. Two engine operating regions defined by engine speed and engine load are established, termed "Region1" and "Region2." When engine speed and load are such that the engine is operating in either of these regions, then dilution control of the present embodiment is labeled as undesirable, for example as it has a deleterious effect on engine driveability, stability, or performance. The recalibration of this embodiment requires a minimum dilution condition and therefore is intended to take place when the engine is operating within either of such regions. The result of the recalibration is an updated linear model of dilution control parameters, specifically, EL and MAP in this embodiment. The linear model is defined by two EL, MAP points—one near Region1 and one near Region2, as will be further explained. Region1 is defined in this embodiment as the engine operating region between predetermined engine speed values RPM1 and RPM2 and between predetermined engine load values El1 and EL2, which speed and load values are determined by establishing a low engine speed-load range in which engine intake air charge dilution is not desired. Likewise, Region2 is defined in this embodiment as the engine operating region between predetermined engine speed values RPM3 and RPM4 and between predetermined engine load values El3 and EL4, which speed and load values are determined by establishing a high speed-load range in which engine intake air charge dilution is not desired.

Figure 6:
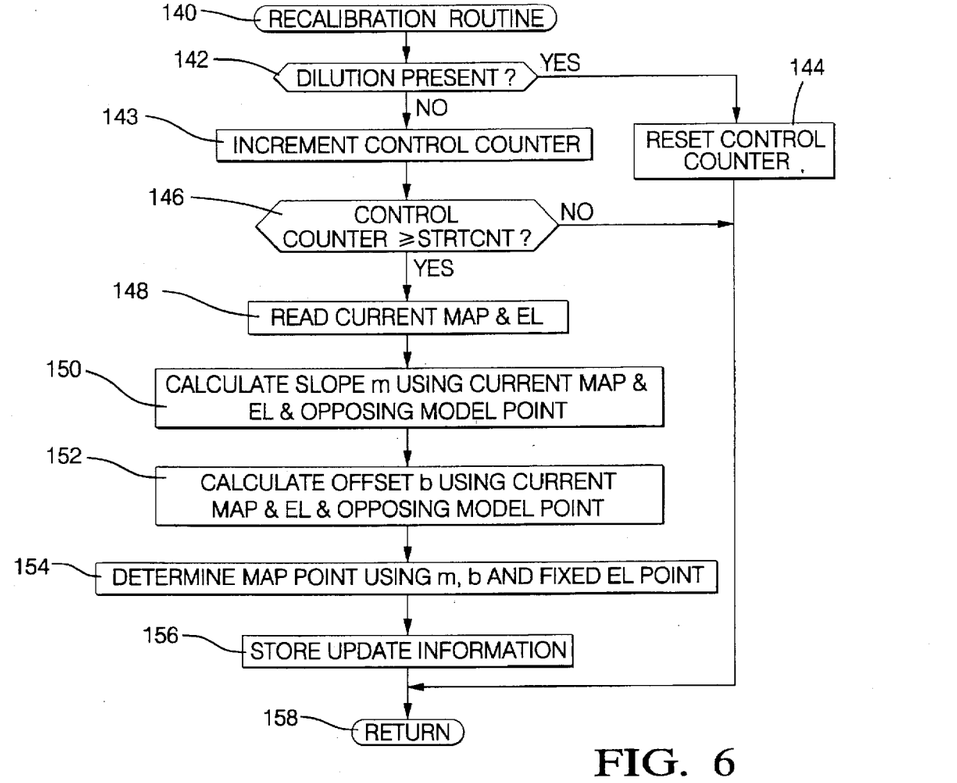
Figure 7:
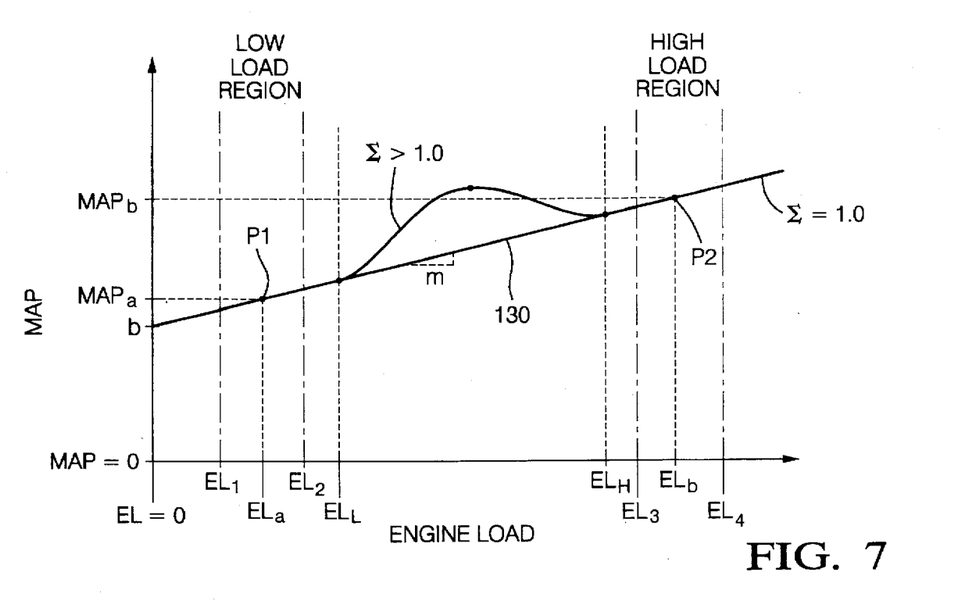
FIG. 7 is a graphical diagram illustrating features of a dilution control parameter relationship periodically recalibrated through the operations of the routines of FIGS. 3-6 and applied to the hardware of FIG. 1.

Returning to the operations of FIG. 5 to provide for such model recalibration and for such integrated dilution control, the operations are initiated at a step 90 when called at the described step 76 of FIG. 4, and then proceed to compare engine speed, indicated by signal RPM, to a first engine speed range corresponding to Region1 and defined by predetermined speed values $RPM_1$ and $RPM_2$. If RPM is within the first engine speed range, then current engine load EL, for example as may be computed as a function of current TP, RPM, and MAP values in a conventional air per engine cycle calculation, is compared to a Low Load Range bounded by EL1 and EL2, at a next step 94. The Low Load Range is illustrated in FIG. 7 and corresponds to Region1. If EL is within the Low Load Range, then the current engine speed-load point is within Region1, and EGR is not currently desirable. Unintrusive recalibration operations requiring minimum dilution are then carried out by proceeding, via a next step 96, to execute a recalibration routine for adjusting, if necessary, the index corresponding to Region1 to account for any variation in the model of the EL-MAP relationship, as described. The recalibration routine is illustrated in FIG. 6 (to be described). Following the recalibration routine, the dilution control operations are complete and a step 124 is executed to return to the operations of step 78 of the routine of FIG. 4.

Returning to the steps 92 and 94, if engine speed or load are not within the speed and load ranges of Region1, then the routine proceeds to determine if they are within Region2. Specifically, the routine proceeds from either the described step 92 or the described step 94 to a step 98 to compare RPM to a Region2 speed range defined by RPM3 and RPM4. If RPM is within the Region2 range, EL is compared to a Region2 load range defined by EL3 and EL4. The Region2 load range is illustrated by the High Load Region of FIG. 7. If EL is between EL3 and EL4 at the step 100, then the engine load and speed indicate that Region2 is active within which dilution control is undesirable. The model of the EL-MAP relationship may therefore be recalibrated by proceeding to the recalibration routine for the index corresponding to Region2, as invoked at a next step 102. Upon completion of the recalibration routine, dilution control procedures are complete for the current engine control interrupt, and the described step 124 is executed.

If either RPM or EL are outside the ranges corresponding to Region1 and to Region2, as determined at the described steps 92, 94, 98 and 100, then operating conditions are such that dilution control is currently desired. The routine therefore proceeds to carry out integrated dilution control operations of steps 104–122, based on the linear relationship between EL and MAP as periodically recalibrated in accord with the operations of the routine of FIG. 6. The dilution control operations begin by referencing a dilution factor $\Sigma$, greater or equal to unity, at a step 104, from a stored schedule of calibrated dilution factors as a function of engine parameters, such as engine speed, engine load, and engine intake plenum air temperature indicated by signal MAT.

$\Sigma$ is proportional to the amount of total non-fuel mass charge as a percentage of fresh air charge, that is required under the current engine operating conditions to provide a desirable level of NOx reduction without reducing engine driveability or stability below an acceptable level. For example, in this embodiment, $\Sigma$ may be expressed as $$\Sigma = (Mid + Med + Mair)/Mair$$

in which Mid, Med and Mair combine to make up the total cylinder non-fuel charge mass, with Mid provided through internal dilution control, Med through external dilution control, and Mair through metering of fresh air past the intake air or throttle valve 32 (FIG. 1). Mid, Med, and Mair are measured in this embodiment as a function of measured engine intake manifold absolute pressure (MAP).

A desired EGR valve pintle position EGRd is next determined at a step 106 as an open-loop external dilution control command as a predetermined function of RPM, EL, MAP and Σ. A schedule of external dilution control commands is established through a conventional calibration procedure to provide for NOx reduction. In one integrated dilution control embodiment of this invention, the external dilution control command is provided for gross adjustment of dilution to achieve a substantial portion of the desired dilution of the intake air charge, as represented by the determined value of Σ. Then, to ensure overall dilution control accuracy, fine dilution adjustment is provided through internal dilution control by varying camshaft phaser position to minimize a difference between actual and desired plenum pressure MAP.

In an alternative embodiment of this invention, internal dilution mass Mid is maximized to provide for both NOx and HC reduction, and only a minor remaining portion of dilution mass is provided through external dilution control. The external dilution is provided only when the internal dilution is substantially saturated, i.e. the camshaft phaser is at an extreme retard angle corresponding to maximum tolerable cylinder valve overlap for maximum backflow. The EGRd schedule is established in accord with the desired level of external dilution for engine operating conditions and for the determined dilution factor Σ. For a large Σ, EGRd may be relatively large, and for small Σ, such as about unity, EGRd may be zero to allow exclusively for internal dilution.

Returning to FIG. 5, after determining EGRd, current actual EGR valve pintle position EGRa is determined at a next step 108 from signal Pegr (FIG. 1) EGR pintle position error Eegr is then determined at a step 110 as a difference between EGRd and Ved. Eegr is then applied in a proportional-plus-derivative-plus-integral control law, or other generally known control law, at a next step 112 to establish a control command EGRc to controllably drive the EGR valve to minimize the difference between the desired and actual EGR valve pintle position, in accord with generally understood classical control procedures, as follows $$EGRc = Kp * Eegr + Kd * d(Eegr)/dt + Ki * \int(Eegr)dt$$

in which control gains Kp, Kd and Ki are established through a conventional calibration procedure, as is generally understood in the art. The control command EGRc is then output, at a step 114, in the form of a conventional control command, such as a duty cycle command to drive the pintle of the EGR valve V 35 into position to provide for the desired external dilution.

The linear model of the dilution control parameter relationship determined and periodically updated in accord with this invention is then applied to determine for the current engine load EL, the pressure in the intake plenum MAPd that will provide the desired degree of intake air charge dilution represented by Σ. FIG. 7 illustrates a model representing such a parameter relationship as a substantially straight line 130 the slope m and offset (or y-intercept) b of which may be defined by first and second points P1 and P2 within respective Low Load and High Load Regions. The low load region is defined as between predetermined load values EL1 and EL2, and the high load region is defined as between predetermined load values EL3 and EL4, as described. Between such two regions is an operating region in which dilution control is desired, as described. The points P1 and P2 are constantly updated to reflect change in a modeled relationship between such dilution control parameters, as will be detailed. The slope m and intercept b of the relationship 130 are applied to determine, for a current engine load EL and a current desired dilution factor Σ, in which Σ>1 (as determined at the described step 104), the intake plenum pressure MAP required to achieve the desired dilution of the engine intake air charge in accord with this invention, as follows:

$$MAPd = \Sigma * (m * EL + b).$$

Pressure error Emap is next determined as a difference between the signal MAP output by the pressure sensor 52 (FIG. 1) and MAPd at a next step 118. A camshaft phaser position command Δφc is then determined as a predetermined function of Emap at a next step 120 under a generally known classical or modern control law, such as a proportional-plus-derivative-plus-integral control law as follows:

$$\Delta\phi c = Kp' * Emap + Kd' * d(Emap)/dt + Ki' * \int(Emap)dt$$

in which control gains Kp', Kd', and Ki' are determined through a conventional calibration procedure, as is generally understood in the art. Δφc may be provided as a duty cycle command suitable for application to a camshaft phaser driver (not shown) for varying the angle of the camshaft phaser 24 of FIG. 2. The determined position command Δφc is next output to the camshaft phaser 24 (FIG. 2) at a next step 122, to drive the camshaft phaser to the angle represented by the position command. The described step 124 is then executed to return to the operations of the routine of FIG. 4.

Referring to FIG. 6, a recalibration routine for periodically and substantially unintrusively recalibrating the dilution control parameter relationship represented by the linear model 130 of FIG. 7 is illustrated in a step by step manner beginning, upon execution of either of the steps 96 or 102 of FIG. 5, at a step 140 and proceeding to determine if dilution is present at a next step 142. Dilution is present if either the EGR valve V 35 (FIG. 1) is open or if the camshaft phaser 24 (FIG. 2) is not in a fully advanced position. The recalibration operations of FIG. 6 are intended to provide a measurement of the relationship between dilution control parameters of manifold absolute pressure MAP and engine load EL in the absence of dilution. The presence of any dilution during the recalibration will perturb the recalibration result, by driving MAP away from a baseline MAP for a given engine load EL. Accordingly, if dilution is present the recalibration procedure is not carried out, by proceeding to reset a control counter at a next step 144 and then returning, via a step 158, to the operations of FIG. 5.

If dilution is not determined to be present at the step 142, the control counter is incremented at a next step 143 and then is compared to a predetermined counter value STRTCNT at a next step 146. STRTCNT is established through a conventional calibration procedure as the number of consecutive iterations of the routine of FIG. 6 required, with a closed EGR valve 35 (FIG. 1) and a fully advanced camshaft phaser 24 (FIG. 2), for residual effects of any prior dilution on manifold pressure MAP to substantially diminish. When the control counter equals or exceeds STRTCNT then, the recalibration of FIG. 6 may be carried out unperturbed by past or present dilution by proceeding from the step 146 to a step 148. Otherwise, if the control counter is less than STRTCNT, the described step 144 is executed, followed by the described step 158.

It should be noted that the inventors intend that an intrusive recalibration procedure is within the scope of this invention wherein either or both of external and internal dilution may be temporarily interrupted to provide for the recalibration procedure of FIG. 6, such as by closing the EGR valve V 35 (FIG. 1) and/or driving the camshaft phaser 24 (FIG. 2) to a fully advanced position at the beginning of the routine of FIG. 6, and then by not proceeding to the step 146 until such interruption in dilution has been present for a calibrated number of iterations of the routine of FIG. 6, such as represented by STRTCNT.

Returning to step 148, current values of MAP and EL are determined by reading the input signals MAP, RPM, and TP, and through application of such read input signals to functions well-known in the art. For example, engine load EL may be determined as a generally understood function of MAP, TP and RPM representing engine intake air per engine cycle.

The slope m of the curve representing an updated relationship between dilution control parameters of EL and MAP is next determined at a step 150 using the current MAP and EL as determined at the step 148. For example, in the case in which the Region1 index is being recalibrated, such determined MAP and EL values are provided as a first point P1, such as illustrated in FIG. 7. The slope m is then determined as the slope of a line passing through point P1 and a second point spaced from P1 along the range of EL and MAP values. The second point may, for example, be termed $P_H$, defined by coordinates ($EL_H$, $MAP_H$), as illustrated in FIG. 7. The slope m is then determined as $$m=(MAP_H-MAPa)/(EL_H-Ela).$$

Alternatively, in the case in which the Region2 index is being recalibrated, such determined MAP and EL values are provided as a second point P2, such as illustrated in FIG. 7. The slope m is then determined as the slope of a line passing through point P2 and a third point spaced from P2 along the range of EL and MAP values. The third point may, for example, be termed PL, defined by coordinates ($EL_L$, $MAP_L$), as illustrated in FIG. 7. The slope m is then determined as $$m=(MAP_b-MAP_L)/(EL_b-EL_L).$$

The updated slope m accounts for change in system flow, backpressure, etc. which leads to a variation in the absolute pressure in the intake plenum 30 (FIG. 1) for a given engine load.

After adjusting the slope m, the offset b is likewise updated at a next step 152 using the current MAP and EL values, as determined at the step 148 and the slope m, as updated at the preceding step 150. More specifically, for either the Region1 or the Region2 recalibration, the offset (also called the y-intercept) b is updated to account for change in the relationship between dilution control parameters of EL and MAP as follows:

$$b=MAP-m*EL$$

in which MAP and EL are the values determined at the described step 148. A new calibration MAP value is next determined at a step 154 using the determined slope m and offset b and a fixed load point. For example, for the Region1 recalibration, the fixed load point is $EL_L$ and for the Region2 recalibration, the fixed load point is $EL_H$. More specifically, for the Region1 recalibration, a new calibration MAP value $MAP_L$ is calculated as $$MAP_L=m*EL_L+b.$$

Likewise, for the Region2 recalibration, a new calibration MAP value MAPH is calculated as $$MAP_H=m*ELH+b.$$

An updated dilution parameter relationship is thereby defined including at least two points defining a relationship between dilution control parameters. For the Region1 recalibration, the two points include a new model point with coordinates ($EL_L$, $MAP_L$) and a prior stored point with coordinates ($EL_H$, $MAP_H$). For the Region2 recalibration, the two points include a new model point with coordinates ($EL_H$, $MAP_H$) and a prior stored point with coordinates ($EL_L$, $MAP_L$). Under the updated relationship, for any measured EL value, a baseline MAP may be determined using the slope m and the offset b and, at the step 116 of FIG. 5, a desired MAP value may be calculated to yield a desired dilution factor Σ. The updated information including the updated m, b, and new model point, is stored for subsequent integrated dilution control and for future recalibration operations at a next step 156. Next, the recalibration routine is concluded and returns, via a next step 158 to execute the described step 124 of FIG. 5.

The inventors intend that the internal dilution control in accord with the integrated dilution control of this application may alternatively be carried out through variation in the timing of intake valve events, such as intake valve closing events, relative to crankshaft angular position, such as through a phaser applied to the intake valve camshaft 37 (FIG. 2) generally in the manner described for the preferred embodiment, and with a fixed timing of exhaust events relative to crankshaft events. The internal dilution control may then be carried substantially in the manner described herein for maintaining a desired level of dilution including a periodic recalibration of dilution control parameters for continued dilution control precision.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. An integrated dilution control method for controlling dilution of intake air passing through an intake manifold of an internal combustion engine having variable valve timing control means for controlling internal dilution by controlling the relative timing of engine cylinder intake and exhaust valve events and having exhaust gas recirculation (EGR) control means for controlling external dilution by controlling recirculation of engine cylinder exhaust gasses through an EGR conduit, the method comprising the steps of:

storing a calibrated model of a relationship between predetermined dilution control parameters;

sensing presence of a predetermined operating condition when dilution of the intake air is required;

controlling dilution when the predetermined operating condition is present, by:

(a) generating a desired dilution value;

(b) calculating a desired intake manifold air pressure as a predetermined function of the desired dilution value;

(c) generating a valve timing command as a function of the desired intake manifold air pressure as the valve timing command providing internal dilution sufficient to drive intake manifold air pressure toward the desired intake manifold air pressure; and (d) controlling internal dilution by controlling relative timing of engine cylinder intake and exhaust valve events in accord with the valve timing command.

2. The method of claim 1, further comprising the steps of: updating the stored model when the predetermined operating condition is not present, by:

(a) minimizing dilution of the engine intake air;

(b) sensing present values of the predetermined dilution control parameters; and adapting the stored model of the relationship between the dilution control parameters so as to include the sensed present values of such parameters in the model.

3. The method of claim 2, wherein the stored model is a model of a function defining a correspondence between the dilution control parameters and wherein the adapting step varies the stored model so that the function defines such correspondence including the correspondence between the sensed present values of the dilution control parameters.

4. The method of claim 1, wherein the predetermined dilution control parameters include engine load and engine intake manifold air pressure.

5. The method of claim 1, wherein the step of controlling dilution further comprises the steps of:

calculating an EGR command as a predetermined function of the desired dilution value;

controlling external dilution by controlling recirculation of engine cylinder exhaust gasses through the EGR conduit in accord with the EGR command.

6. The method of claim 5, wherein the step of generating a valve timing command is integrated with the step of calculating a desired EGR command so as to maximize internal dilution and to minimize external dilution.

7. The method of claim 5, wherein the EGR control means includes an EGR valve in the EGR conduit responsive to an EGR control signal for restricting exhaust gas flow through the conduit, the method further comprising the steps of:

calculating desired EGR valve position as a predetermined function of the desired dilution value;

sensing actual EGR valve position; and determining EGR valve position error as a difference between desired and actual EGR valve position, and wherein the step of calculating an EGR command calculates an EGR command as a predetermined function of the position error.

8. An integrated dilution control method for controlling a degree of dilution of intake air ingested by an internal combustion engine having variable valve timing control means for controlling the relative timing of engine cylinder intake and exhaust valve events, and having an exhaust gas conduit through which combustion products are exhausted from engine cylinders, with an exhaust gas recirculation (EGR) conduit opening, on a first conduit end, into the exhaust gas conduit and opening, on a second end, into an engine intake manifold, the EGR conduit having an EGR valve therein responsive to an EGR command to vary a degree of opening of the EGR valve, the method comprising the steps of:

storing a predetermined model describing correspondence between predetermined dilution control parameters;

determining presence of an engine operating condition under which dilution control is desired;

integrating internal and external dilution control when the engine operating condition is determined to be present, by (a) referencing a desired dilution factor, (b) calculating a valve timing control command as a predetermined function of the desired dilution factor, (c) calculating an EGR control command as a predetermined function of the desired dilution factor, (d) controlling valve timing in accord with the valve timing control command and controlling the degree of opening of the EGR valve in accord with the EGR control command; and adjusting the stored model when the engine operating condition is not determined to be present, by (a) determining current values of the dilution control parameters, (b) determining a correspondence between the current values, and (c) varying the stored model so that it further describes the correspondence between the current values of the dilution control parameters.

9. The method of claim 8, wherein the step of calculating a valve timing control command further comprises the steps of:

sensing engine load;

referencing a desired intake manifold air pressure as a predetermined function of the desired dilution factor and of the sensed engine load;

sensing actual intake manifold air pressure;

determining a pressure error as a difference between desired and actual intake manifold air pressure; and calculating the valve timing control command as a function of the pressure error.

10. The method of claim 8, wherein the integrating step integrates internal and external dilution control so as to maximize internal dilution mass and to minimize external dilution mass.

11. The method of claim 8, wherein the step of calculating an EGR control command further comprises the steps of:

calculating a desired degree of opening of the EGR valve as a predetermined function of the desired dilution factor and of the valve timing command;

determining an actual degree of opening of the EGR valve;

subtracting the actual degree of opening of the EGR valve from the desired degree of opening of the EGR valve to form an opening difference; and calculating the EGR valve control command as a function of the opening difference.

* * * * *